US006295361B1

(12) United States Patent
Kadansky et al.

(10) Patent No.: US 6,295,361 B1
(45) Date of Patent: Sep. 25, 2001

(54) METHOD AND APPARATUS FOR MULTICAST INDICATION OF GROUP KEY CHANGE

(75) Inventors: Miriam C. Kadansky, Westford; Stephen R. Hanna, Bedford, both of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/107,616

(22) Filed: Jun. 30, 1998

(51) Int. Cl.⁷ .................................................. H04L 9/08

(52) U.S. Cl. ....................... 380/278; 380/273; 713/163

(58) Field of Search .................................. 713/155, 160, 713/163, 201; 380/278, 273

(56) References Cited

U.S. PATENT DOCUMENTS 5,748,736 * 5/1998 Mittra .................................... 713/163
6,049,878 * 4/2000 Caronni et al. ....................... 713/201

FOREIGN PATENT DOCUMENTS

| 0 776 107 | 5/1997 | (EP) . |
| WO 97/26730 | 7/1997 | (WO) . |
| WO 98/25422 | 6/1998 | (WO) . |

OTHER PUBLICATIONS

Web Page, Title: "SKIP—Simple Key Management for Internet Protocols/IP–Level Cryptography", Last Updated: Jan. 23, 1998, URL: http://www.slip.org/, pp. 1–3.
Web Page, Title: "SKIP—Simple Key Management for Internet Protocols/IP–Level Cryptography", Last Updated: Feb. 26, 1998, URL: http://www.slip.org/, pp. 1–3.
Web Page Article, Title: "Sun Tries to SKIP the Competition", By: Jim Kerstetter and Claudia Graziano, PC Week Online, Dated: Feb. 16, 1998, pp. 1–3, URL: http://www-.zdnet.com/pcweek/news/0216/16sun.html.
Web Page Article, Title: "VPNs: Security with an Uncommon Touch", By: Deval Shah and Helen Holzbaur, Data Communications, Dated: Sep. 21, 1997, pp. 1–8, URL: http://www.data.com/lab_tests/vpn.html.

(List continued on next page.)

*Primary Examiner*—Tod Swann
*Assistant Examiner*—Matthew Smithers
(74) *Attorney, Agent, or Firm*—Squire, Sanders & Dempsey LLP

(57) ABSTRACT

A method and apparatus to allow a key manager node in a network to initiate the process of changing a group key for all nodes in a multicasting group. In the described embodiment, the key manager node initiates changing the group key by setting an indicator in a multicast packet. The indicator indicates that each of the nodes in the multicast group should obtain a new group key from the key manager node. The key manager node sets the indicator whenever the key manager node determines that the nodes in the group need to change their key. The nodes in the multicast group then obtain a key from the key manager node. In one embodiment of the present invention, the key manager node sends the group key to the members of the group and, once all nodes in the group have received their key, sends an indicator that the group members should start using the new keys. In another embodiment, the key manager node sends the new key to the group, along with instructions specifying when the new key is to take effect. For example, the new key can take effect at a certain time or when a certain packet number is received. In another embodiment, each receiver in the group uses both the new key and the old key for a predetermined time period or until all group members have received the key.

46 Claims, 13 Drawing Sheets

Key Management (indication of key change)

OTHER PUBLICATIONS

Web Page Article Title: "SKIP Your Way to Security", By: Ken Sicsisca, SunWorld Online, Last Updated: Mar. 21, 1998, pp. 1–10, URL: http://www.sun.com/sunworldonline/swol–06–1997/swol–06–skip.html.

Web Page, Title: "SunScreen SKIP for Windows 95", Printed: Mar. 24, 1998, p. 1, URL: http://www.skip.org.w95/.

Web Page Article, Title: "Elvis+ Makes Sun's Advanced Security Protocol Available for First Time in Overseas Markets", Dated: May 1997, 1997, pp. 1–3, URL: http://www.skip.org/press–elvis.html.

Web Page Article, Title: "Simple Key—Management for Internet Protocols (SKIP)", By: Ashar Aziz, Tom Markson and Hemma Prafullchandra, Printed: Mar. 24, 1998, pp. 1–24, URL: http://www.skip.org/spec/SKIP.html.

Article: "Grouping Techniques for Update Propagation in Intermittently Connected Databases*", By: Sameer Mahajan, Michael Donahoo, Shamkant Navathe, Mostafa Ammar and Sanjoy Malik, Georgia Institute of Technology, Atlanta, GA 30332, USA, pp. 46–53.

Article: "Enclaves: Enabling Secure Collaboration Over the Internet", By: Li Gong, IEEE Journal on Selected Areas in Communications, vol. 15, No. 3, Apr. 1997, pp. 567–575.

* cited by examiner

Multicast Network (sending data)

Key Management (indication of key change)

Key Management (indication of key change)

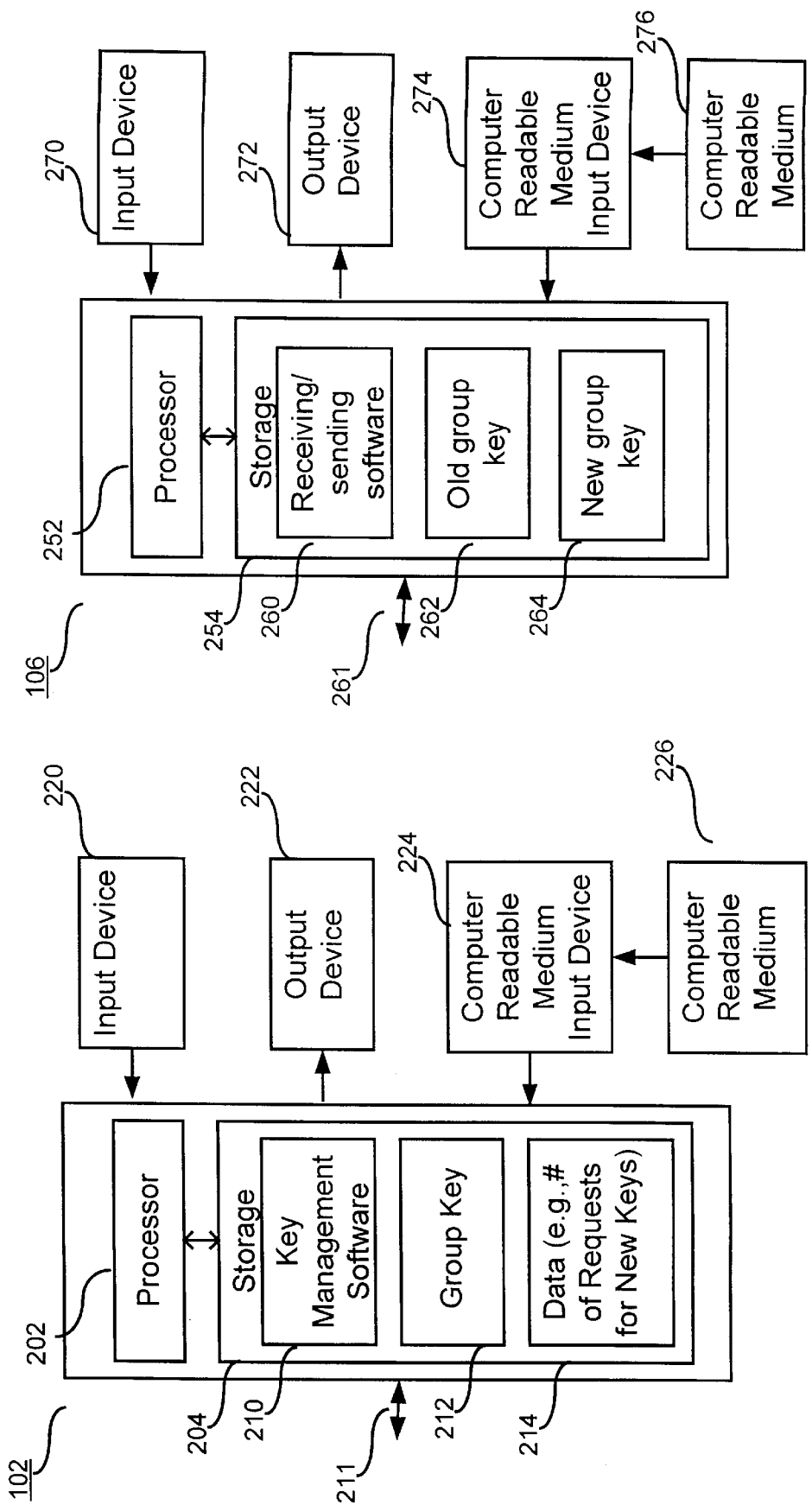
Fig. 2(b) Group Member Node
Fig. 2(a) Key Manager

Data Packet Diagram

METHOD AND APPARATUS FOR MULTICAST INDICATION OF GROUP KEY CHANGE

BACKGROUND OF THE INVENTION

The present invention relates generally to networking and, specifically, to a method and apparatus allowing a key manager node in a network to initiate a process of changing a group key for multiple members of a group in the network.

Internet Protocol (IP) multicasting is useful for disseminating data to a large group of receivers in a network. Multicasting of data is a form of network communication in which a transmitting node (a "sender") sends the data via a single message to multiple destinations at once. The multiple destinations are the recipients ("receivers") of the message. Other methods of network communication include broadcast, in which a sender transmits to all possible recipients, and unicast, in which the sender transmits only to one specific recipient. Multicast is described in more detail in T. A. Maufer, *Deploying IP Multicast in the Enterprise*, Prentice Hall PTR, 1998, which is herein incorporated by reference in its entirety to the extent that it does not conflict with the invention as described herein. A multicast sender may send a message to a selected group of receivers in a multicast group. A multicast group includes at least one sender that transmits data to nodes on a particular multicast address. A multicast group also includes one or more receivers. A receiver is a node that listens on a particular address in the network. Receivers become members of the group because they are interested in receiving messages. A node may be both a sender and a receiver of data to and from other nodes.

In certain conventional multicast systems, a sender distributes a group key to all nodes in the multicast group. Each member in the multicast group receives the same group key. This group key may be used by the one or more senders to encrypt data and by the receivers to decrypt the data sent to the group or to decrypt other, individual keys sent to the group members. When a member leaves a group or is no longer trusted, it is necessary to change the group key so that the former member will not be able to decrypt information encrypted with the group key. It is also wise for the sender to change the group key periodically in case the key has been compromised. It is also wise to change the group key if enough time has passed since the group key was last distributed that the group key could be compromised.

Some conventional multicasting systems, such as the "Enclave" system developed by Li Gong (as described in L. Gong, "Enclaves: Enabling Secure Collaboration over the Internet". IEEE Journal on Selected Areas in Communications, 15(3):567–575, April 1997) allow the sender to distribute a new key (encrypted separately for each member) directly via multicasting. Unfortunately, this method does not scale to large numbers of members, since the amount of data multicast to all members grows as the number of members grows.

As another example, the SKIP (Simple Key Management for Internet Protocols) protocol distributes keys that are deemed valid for a certain predetermined time period and updates these keys by a unicast. This distribution method causes a problem when a member leaves the group, since the member still has access to the group key until that group key expires. SKIP does not allow for quick key change when a member leaves the group or is suspected to be compromised.

SUMMARY OF THE INVENTION

Described embodiments of the present invention allow a key manager node in a network to initiate the process of changing a group key for all nodes in a multicasting group. A "key manager" is the network entity in charge of key distribution and management. In the described embodiment, the key manager node initiates changing the group key by setting an indicator (called a "key change indicator") in a multicast packet. The key change indicator indicates that each of the nodes in the multicast group should obtain the new group key. The key manager sets the indicator whenever the key manager determines that the nodes in the group need to change their key. The members in the multicast group then obtain the new group key from the key manager via an appropriate key distribution process.

Various embodiments use one of several methods described herein to perform key distribution. In certain embodiments, the group members individually request a new group key. In other embodiments, the key manager transmits the key to the group members using another appropriate mechanism. In one embodiment of the present invention, the key manager distributes the group key to the members of the group in response to a request from each member. Once all group members have received the new group key (or a timeout has occurred), the key manager sends an indicator that the group members should start using the new group key. In another embodiment, the key manager sends the new group key to the group members, along with instructions specifying when the new key is to take effect. For example, the new key can take effect at a certain time or for all received packets having a packet number higher than a certain packet number. In another embodiment, each receiver in the group uses both the new group key and the old group key for a predetermined time period or until all group members have received the key, while each sender in the group receives an indication from the key manager that it should switch to the new group key. In still other embodiments, the key manager unicasts or multicasts the new group key to the group members without receiving a request.

Various embodiments implement the key change indicator in different ways. As discussed above, the key change indicator can be a flag formed of one or more bits in a packet. The key change indicator can also be an indicator in the data, such as a control character. The key change indicator can also be a separate type of packet or message. Similarly, the indicator that the group should start using the new key, which is used in certain embodiments, can also be a flag, a control character, a type of packet or message, or any other appropriate type of indicator.

The group key used in the described embodiments of the present invention is a shared secret key, as is known to persons of ordinary skill in the art. An example of such a shared secret key encryption method is the DES encryption method.

In accordance with the purpose of the invention, as embodied and broadly described herein, the invention relates to at least a method of changing a group key, comprising the steps performed by a node including a key manager function in a system for processing data, of: sending an indicator to each member of a group that it is time to change the group key; and distributing a new group key to at least one member of the group.

In further accordance with the purpose of the invention, as embodied and broadly described herein, the invention relates to a method of changing a group key, comprising the steps performed by a system for processing data, of: sending, by a key manager node, an indicator to each member of a group that it is time to change the group key;

and distributing, by the key manager node, a new group key to at least one member of the group.

In further accordance with the purpose of the invention, as embodied and broadly described herein, the invention relates to method of changing a group key, comprising the steps performed by a member of a group in a system for processing data, of: receiving, by the member of the group, an indicator that it is time to change the group key; sending, by the member of the group, in response to the indicator, a request for a new group key; and receiving, after the sending step, the new group key.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2(a) is a diagram of a key manager data processing system in accordance with an embodiment of the present invention.

FIG. 2(b) is a diagram of a group member data processing system in accordance with an embodiment of the present invention.

DETAILED DESCRIPTION OF PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts.

I. General Discussion

Figure 1A:
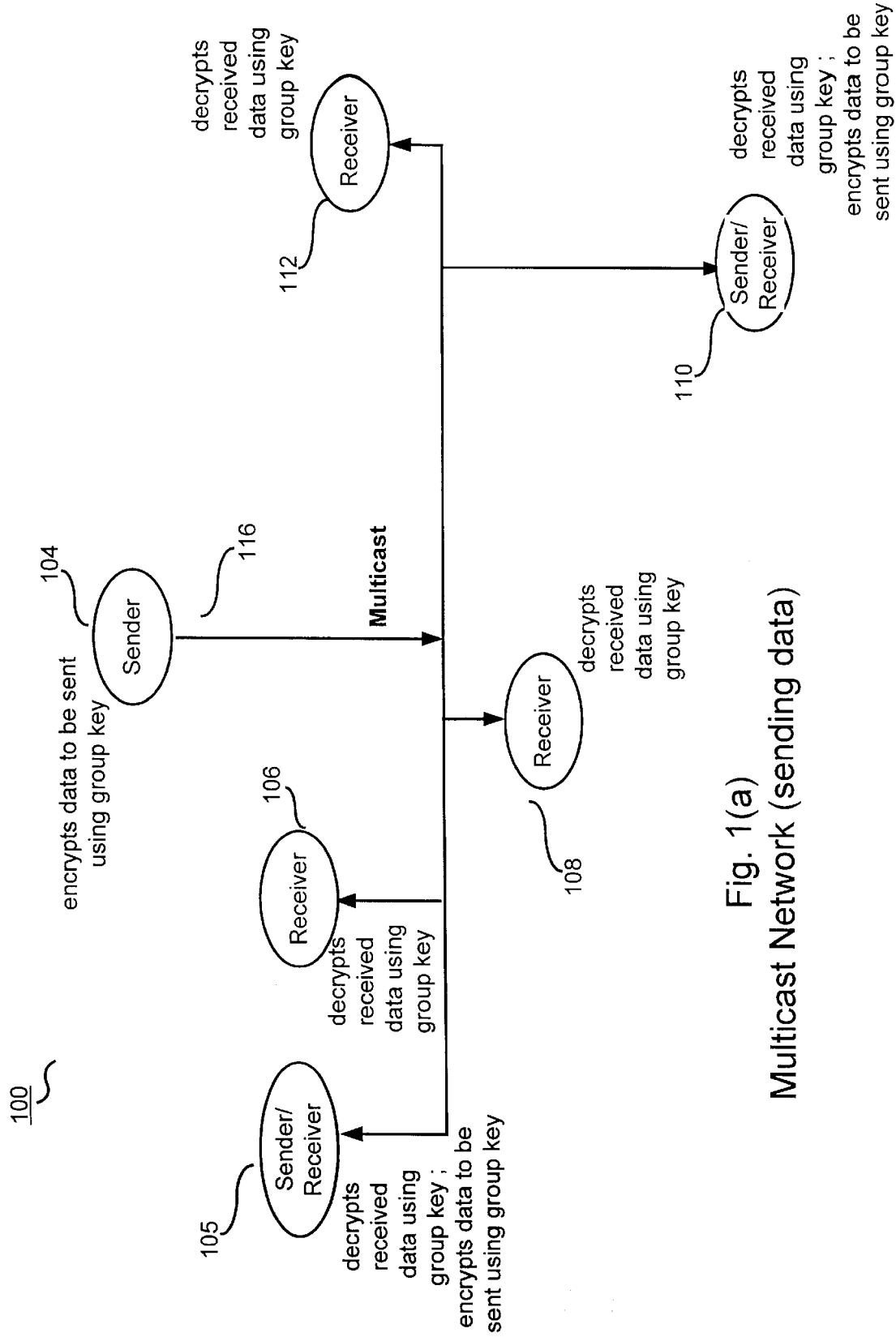
FIG. 1(a) is a block diagram of sending packets by a sender in a conventional multicast network.

FIG. 1(a) is a block diagram showing a sender multicasting packets in a multicast network. FIG. 1(a) shows a general diagram of how data is sent from a sender node 104 to the nodes in its multicast group. The nodes in the multicast group of FIG. 1(a) include nodes 105, 106, 108, 110, and 112. As shown, the nodes to which the sender sends data can be other senders and receivers. In general, sender 104 sends a multicast packet as indicated by line 116. The sender encrypts using the group key. The nodes decrypt using the group key. Any of sender nodes 104, 105, 110 can send data in the manner shown in FIG. 1(a). The nodes of FIG. 1(a) may be connected by any type of appropriate communication medium, such as an Ethernet, the Internet, wireless communications, cellular communications, etc.

Figure 1B:
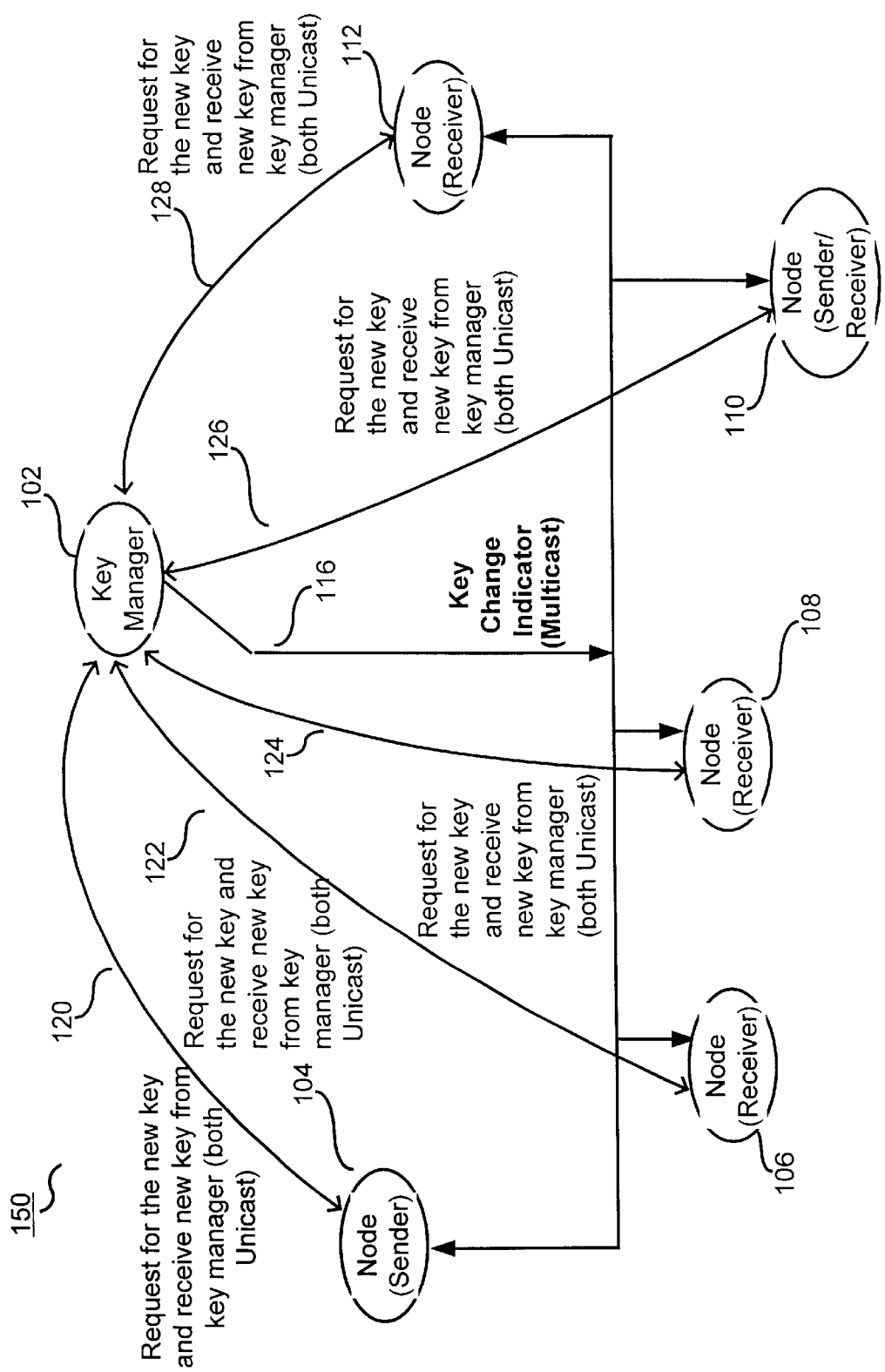
FIG. 1(b) is a block diagram of a multicast network wherein a key manager node sends a key change indicator in accordance with an embodiment of the present invention.

FIG. 1(b) is a block diagram of an embodiment of a network in accordance with the present invention wherein key manager node 102 sends a key change indicator to the nodes of the multicast group in accordance with an embodiment of the present invention. A key manager 102 is the network entity in charge of key distribution. As shown in the Figure, key manager 102 multicasts a key change indicator to each node in the multicast group. This multicast is herein referred to as "key change indication." Each member of the multicast group unicasts back a request for the new group key. Although not shown in FIG. 1(b), key manager 102 then sends the new group key to the group members using any of several methods, examples of which are shown in FIGS. 3–8 below. This is herein referred to as "key distribution."

Figure 1C:
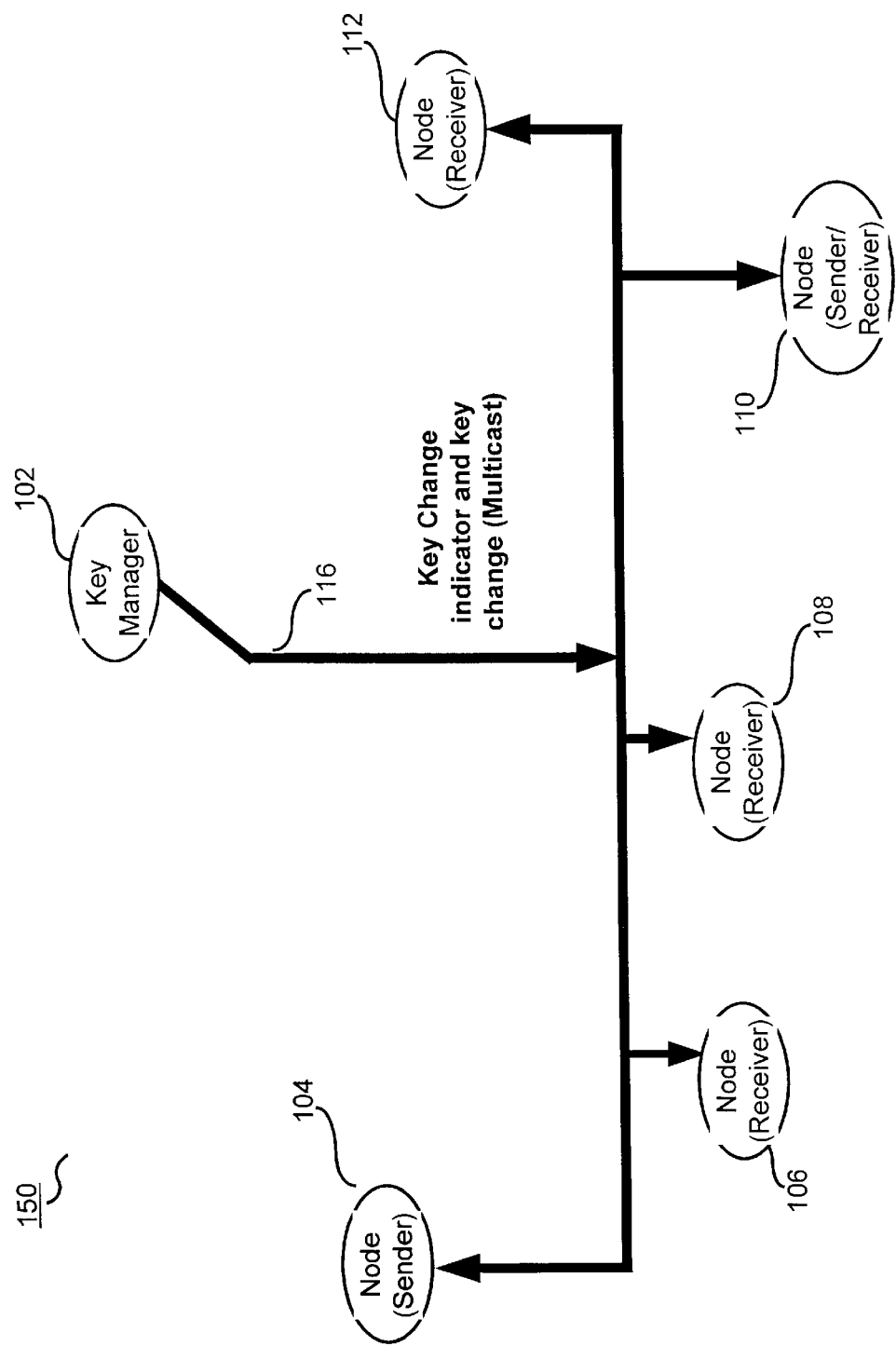
FIG. 1(c) is a block diagram of a multicast network wherein a key manager node sends a key change indicator in accordance with an embodiment of the present invention.

FIG. 1(c) is a block diagram of another embodiment of a network in accordance with the present invention wherein key manager node 102 sends a key change indicator to the nodes of the multicast group in accordance with an embodiment of the present invention. This multicast is herein referred to as "key change indication." In this embodiment, the key manager further distributes the group key to the group using an appropriate multicast key distribution mechanism (key change).

As shown in FIGS. 1(b) and 1(c), the multicast group to which key manager 102 sends a key change indicator can include both senders and receivers. In some embodiments, key manager 102 is a separate node. In other embodiments, any node capable of sending (such as sender 104) can also act as the key manager. Still other embodiments can include more than one key manager. Having more than one key manager provides fault tolerance and robustness in the system, since it allows a key manager to fail without shutting down the key distribution mechanism. If there is more than one key manager 102, the key managers need to communicate with each other to prevent more than one key manager from trying to change the group key at a given time.

The group key used in the described embodiments of the present invention is a shared secret key, as is known to persons of ordinary skill in the art. An example of such a shared secret key encryption method is the DES encryption method. The shared secret key method can also be used to distribute other kinds of keys to a group.

FIG. 2(a) is a diagram of a key manager data processing system in accordance with an embodiment of the present invention. It will be understood that the term "data processing system" covers any type of system that processes data, such as a cellular telephone, a handheld processing unit, a network computer, a personal digital assistant, an internet appliance, etc. Key manager 102 includes processor 202 and storage area (such as a memory) 204. Storage area 204 includes at least key manager software 210 to accomplish multicasting and/or unicasting. Key manager software 210 can also send and receive unicast transmissions to and from the nodes in its group. Storage area 204 in key manager 102 further includes at least one group key 212 and data 214, such as a number of requests for the new group key currently received by the key manager.

FIG. 2(b) is a diagram of a group member node data processing system 106 in accordance with an embodiment of the present invention. In the following discussion, the term "group member" applies to a node that receives a key change indicator from the key manager 102. Some of the "group members" can also be senders of data themselves under other circumstances, while other group members are only receivers of data from the senders. Group member 106 is shown as including processor 252 and storage area (such as a memory) 254. Storage area 254 in group member 106 includes at least receiving/sending software 260. Receiving/sending software 260 can receive multicast and unicast transmissions from the key manager and can also send unicast transmissions to key manager 102. Storage area 254 in group member 106 further includes at least one new group key 262 and at least one old group key 264. In certain embodiments, storage area 254 includes a set of previously distributed group keys.

Although, in FIGS. 2(a) and 2(b), each of key manager 102 and group member 106 is shown in a separate data processing system/network element, it should be understood that one or more of elements 102 and 106 (and/or one or more of the other group members) also can be resident on the same data processing system/network element. Furthermore, the functionality of elements 102 and 106 can be distributed between additional data processing systems, nodes, or network elements (not shown) without departing from the spirit and scope of the present invention.

Each key manager 102 and group member 106 preferably includes a respective input device 220, 270 such as a keyboard, a touchpad, or a mouse that receives input from a user or other appropriate source. Each key manager 102 and group member 106 also preferably includes a respective output device 222, 272 such as a display screen, a printer, etc. that outputs information to the user or other appropriate destination. In addition, each key manager 102 and each group member 106 preferably includes a respective computer readable medium input device 224, 274, which is capable of reading a computer readable medium 226, 276.

A person of ordinary skill in the art will understand that the systems of FIGS. 2(a) and 2(b) may also contain additional information, such as input/output lines; input devices, such as a keyboard, a mouse, and a voice input device; and additional display devices. The systems of FIGS. 2(a) and 2(b) may also include application programs, operating systems, data, etc., which are not shown in the figure for the sake of clarity. It also will be understood that the systems of FIGS. 2(a) and 2(b) can also include numerous elements not shown, such as disk drives, keyboards, display devices, network connections, additional memory, additional CPUs, additional processors, LANs, input/output lines, etc.

In the following discussion, it will be understood that the steps of methods and flow charts discussed preferably are performed by processor 202, 252 (or other appropriate processors) executing instructions stored in respective storage areas 204, 254 (or other appropriate storage areas). Specifically, the steps described herein are performed by one of key manager software 210 and receiving/sending software 260 in, respectively, key manager 102 and group member 106. It will also be understood that the invention is not limited to any particular implementation or programming technique and that the invention may be implemented using any appropriate techniques for implementing the functionality described herein. The invention is not limited to any particular programming language, operating system, or network protocol.

Some or all of the instructions and data structures in storage areas 204, 254 may be read into memory from computer-readable media 226, 276. Execution of sequences of instructions contained in the storage areas causes processors 202, 252 to perform the process steps described herein. In alternative embodiments, hard-wired circuitry may be used in place of or in combination with software instructions to implement the invention. Thus, preferred embodiments of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications, or electrical signals transmitted over a computer network.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions of key manager software 210 or group member 106 may initially be carried on a magnetic disk or a tape. The instructions are loaded into storage area 204, 254. Alternately, instructions can be sent over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The connection between key manager 102 and group member 106 is generally designated 211, 261 and can be any appropriate connection.

The following paragraphs describe several ways of disseminating the group key to a multicast group. Both the senders and receivers of the multicast group need the group key in order to encrypt data to be sent (by a sender) and to decrypt data received (by a receiver).

II. Key Management

FIGS. 3–8 show several embodiments of a key change indication step, in which the key manager indicates that the group key is going to be changed, and a key change step in which the new group key is distributed (or begun to be used, if it was previously distributed). It will be understood that the following embodiments are described for the purpose of example only and are not intended to limit the present invention.

Figure 3:
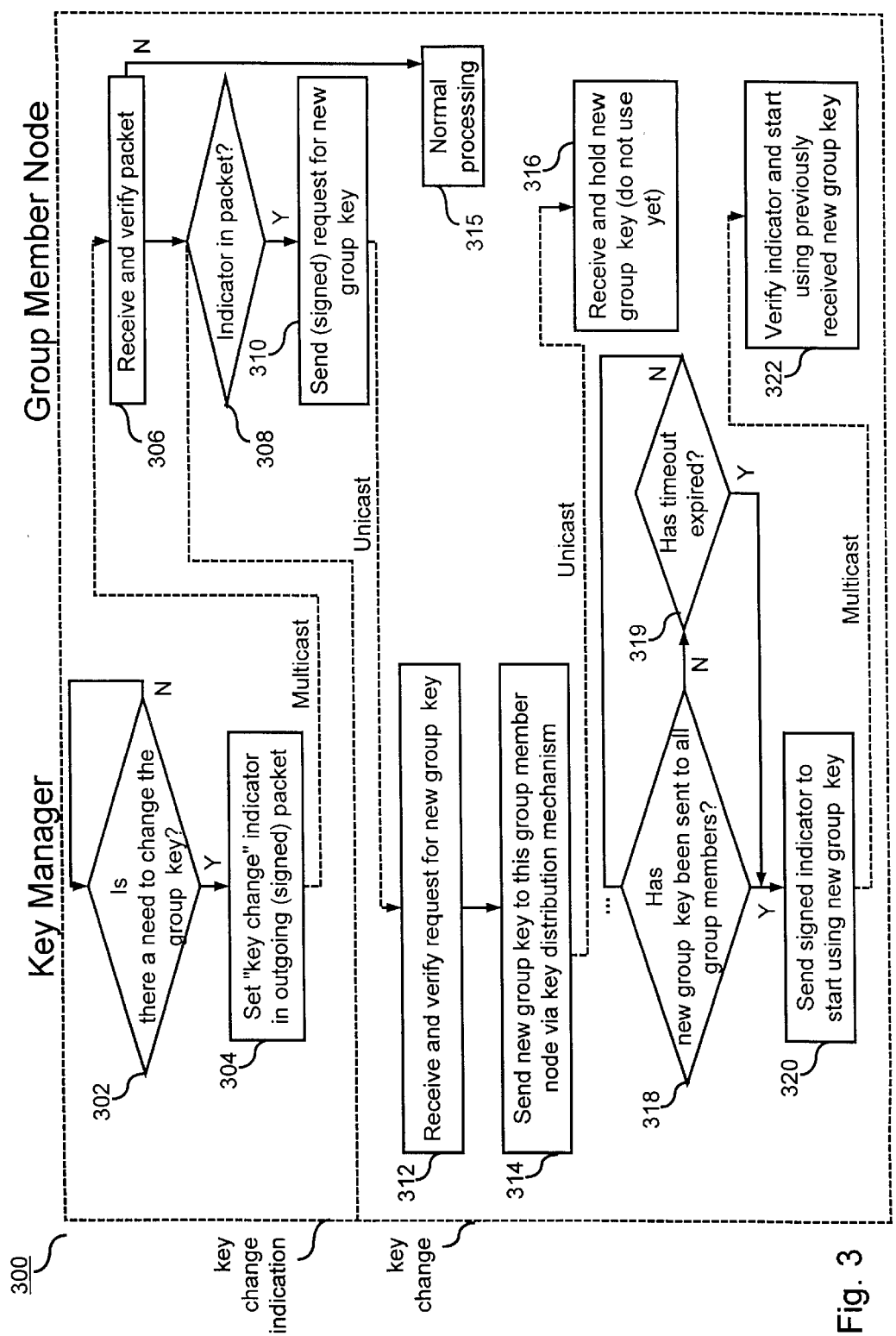
FIG. 3 is a flow chart showing steps performed by a first embodiment of the present invention to disseminate a group key.

FIG. 3 is a flow chart 300 showing steps performed by a first embodiment of the present invention to disseminate a group key. Steps performed by key manager 102 are shown on the left of the figure. Steps performed by a member in a multicast group, e.g., group member 106, are shown on the right of the figure. In step 302, key manager 102 determines whether there is a need to change the group key. A need to change the group key may arise, for example, if one of the members has dropped out of the group and is no longer qualified to send or receive multicast data. As another example, key manager 102 may change the group key at regular predetermined intervals.

Figure 9:
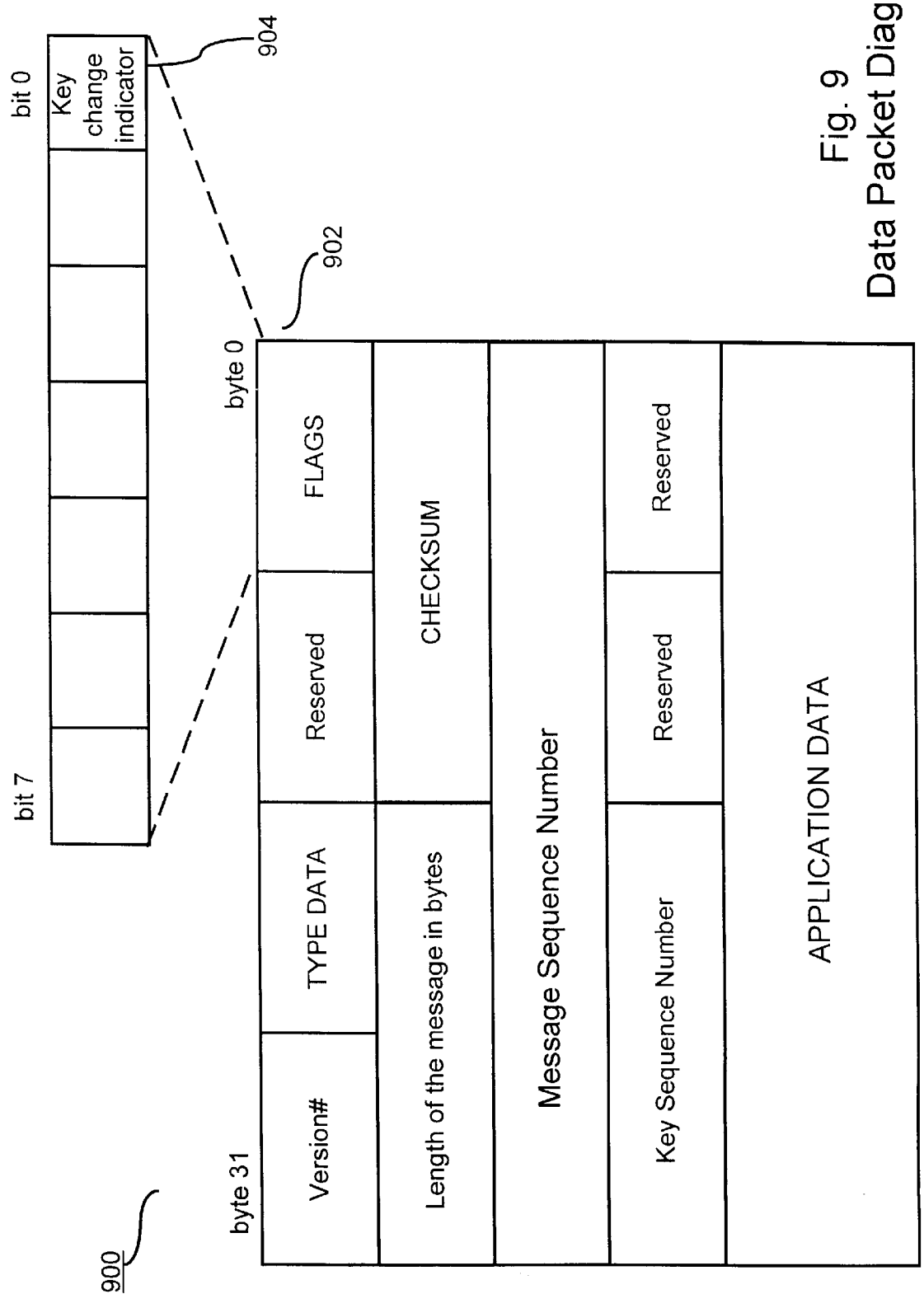
FIG. 9 is a diagram showing an example of a packet format including a key change indicator.

If there is a need to change the group key, key manager 102 sets the key change indicator in step 304. This key change indicator can be, for example, one or more bits in the multicast packet. An example of such bit or bits is shown in FIG. 9, which shows a key change indicator 904 in the flags field 902 of a multicast packet. Key change indicator 904 can be a flag in a packet. The key change indicator can also be an indicator in the data, such as a control character. The key change indicator can also be a separate type of packet or message. For example, key manager 102 can send a type of packet that is only sent when it is time to change the group key. In step 304, key manager 102 sends the new key group key available indicator in an outgoing, signed packet using multicast transmission. This packet is preferably signed by key manager 102. Having key manager 102 sign the packet using public key encryption or other appropriate technique prevents unauthorized nodes from trying to change the group key.

In step 306, group member 106 receives the packet and verifies the signature to ensure that the packet was signed by a legitimate key manager. If, in step 308, group member 106 determines that there is a key change indicator in the packet (or that the key change has been indicated in some other way), group member 106 preferably unicasts a signed request for the new group key to the key manager 102 (as shown in FIG. 1(b)). Requiring the group member to sign its request ensures that the key manager will be able to tell whether the request comes from a legitimate group member. Note that each group member sends a separate request for the new group key.

Figure 10A:
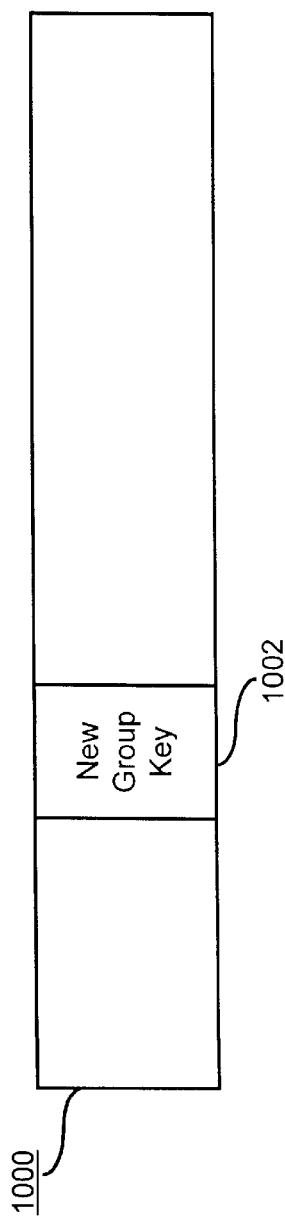
FIGS. 10(a)–10(c) are diagrams showing various examples of a packet used to send the new group key to a member of the group.
Figure 10B:
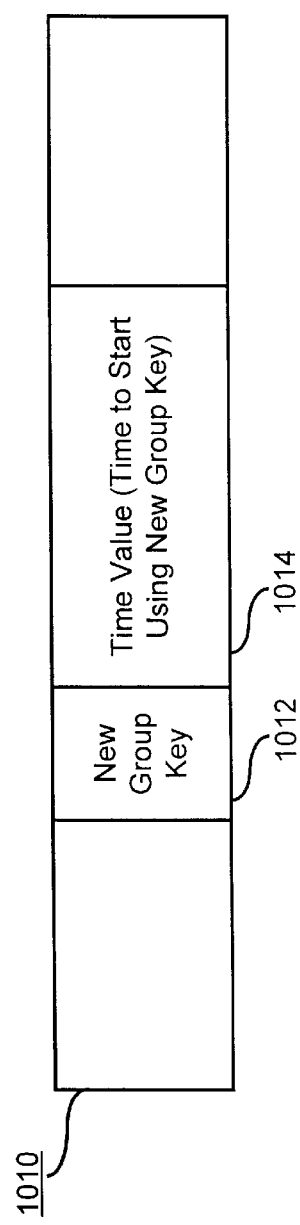

In step 312, key manager 102 receives the request for a new group key and verifies the signature. In step 314, key manager 102 preferably unicasts the new group key to the requesting group member via any appropriate key distribution mechanism. In step 316, group member 106 receives the new group key and holds the new group key in its storage area. It will be understood that the key distribution mechanism can encrypt the group key when it is sent between the key manager and group member if such encryption is appropriate. Examples of a packet including a group key are shown in FIGS. 10(a)–10(b), as discussed below in connection with that Figure.

In step 318 of FIG. 3, if key manager 102 determines that all members of the multicast group have requested and been sent the new group key (or a timeout has occurred in step 319), key manager 102 multicasts an indicator to the group members to tell them to start using the new group key. This indicator can be signed the key manager. Requiring that the key manager 102 sign the indicator allows the group members to determine whether the indicator comes from a legitimate key manager. In step 322, group member 106 receives and verifies the indicator to start using the new group key. Group member 106 then starts using the new group key to receive messages from other nodes in the group. If the group member receiving the new group key can send data (e.g., sender 104 of FIG. 1(b)), then the node also starts using the new group key at this time to encrypt data to be sent. The indicator that the group member should start using the new key can be a flag, a control character, a type of packet or message, or any other appropriate type of indicator.

Figure 4:
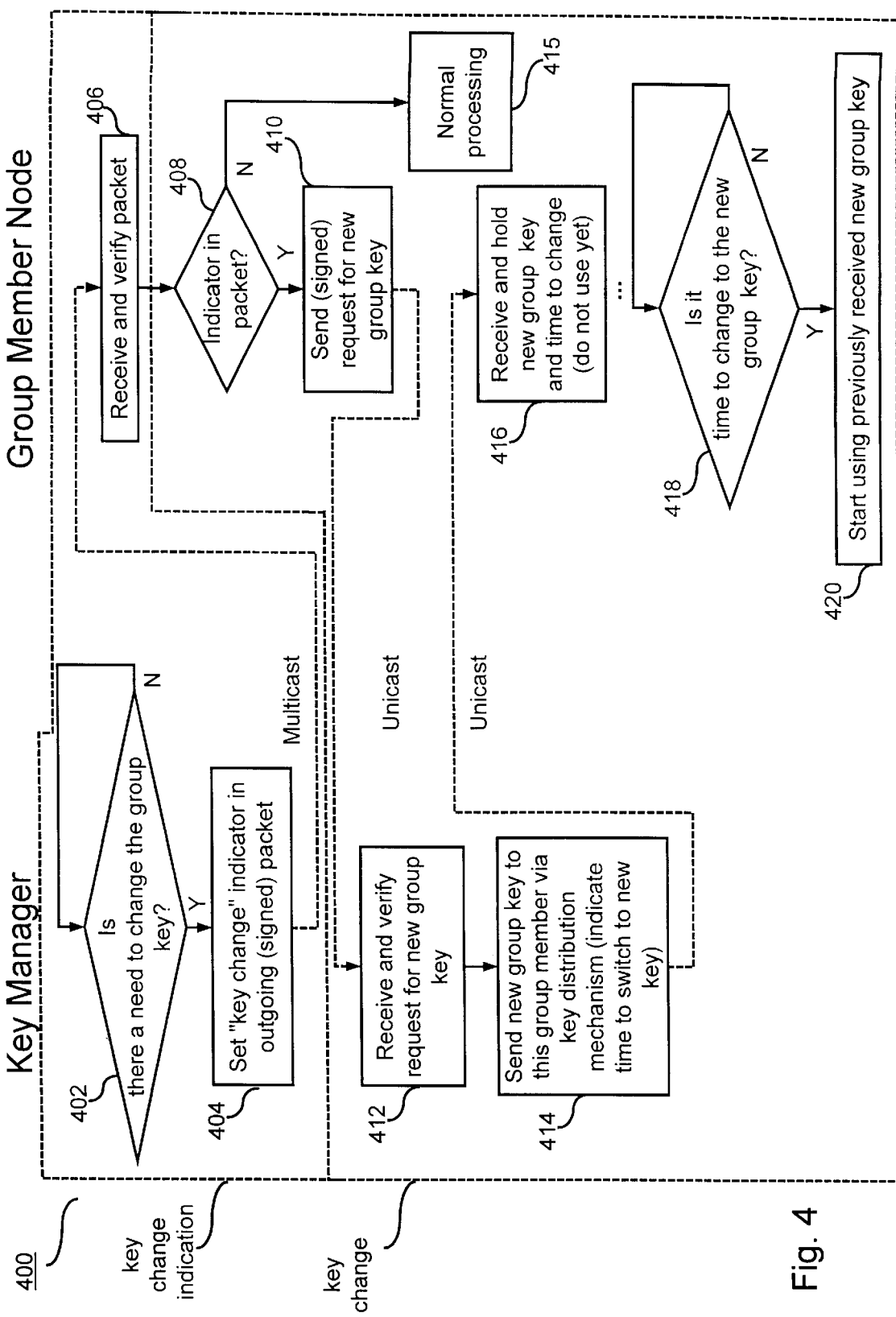
FIG. 4 is a flow chart showing steps performed by a second embodiment of the present invention to disseminate a group key.

FIG. 4 is a flow chart 400 showing steps performed by a second embodiment of the present invention to disseminate a group key. Steps 402 through 412 are similar to steps 302 through 312 of FIG. 3 and will not be described in detail. In step 414, key manager 102 preferably unicasts the new group key to the requesting group member via any appropriate key distribution mechanism. The unicast of step 414 also includes a time value. This time value represents the time at which the switch to the new group key is to occur. An example of a packet including the key and a time value is shown in FIG. 10(b), as discussed below in connection with that Figure. In step 416, group member 106 receives the new group key and the time value and holds the new group key and the time value in its storage area. It will be understood that the key distribution mechanism encrypts the group key and/or time value when they are sent between the key manager and group member if such encryption is appropriate.

Figure 5:
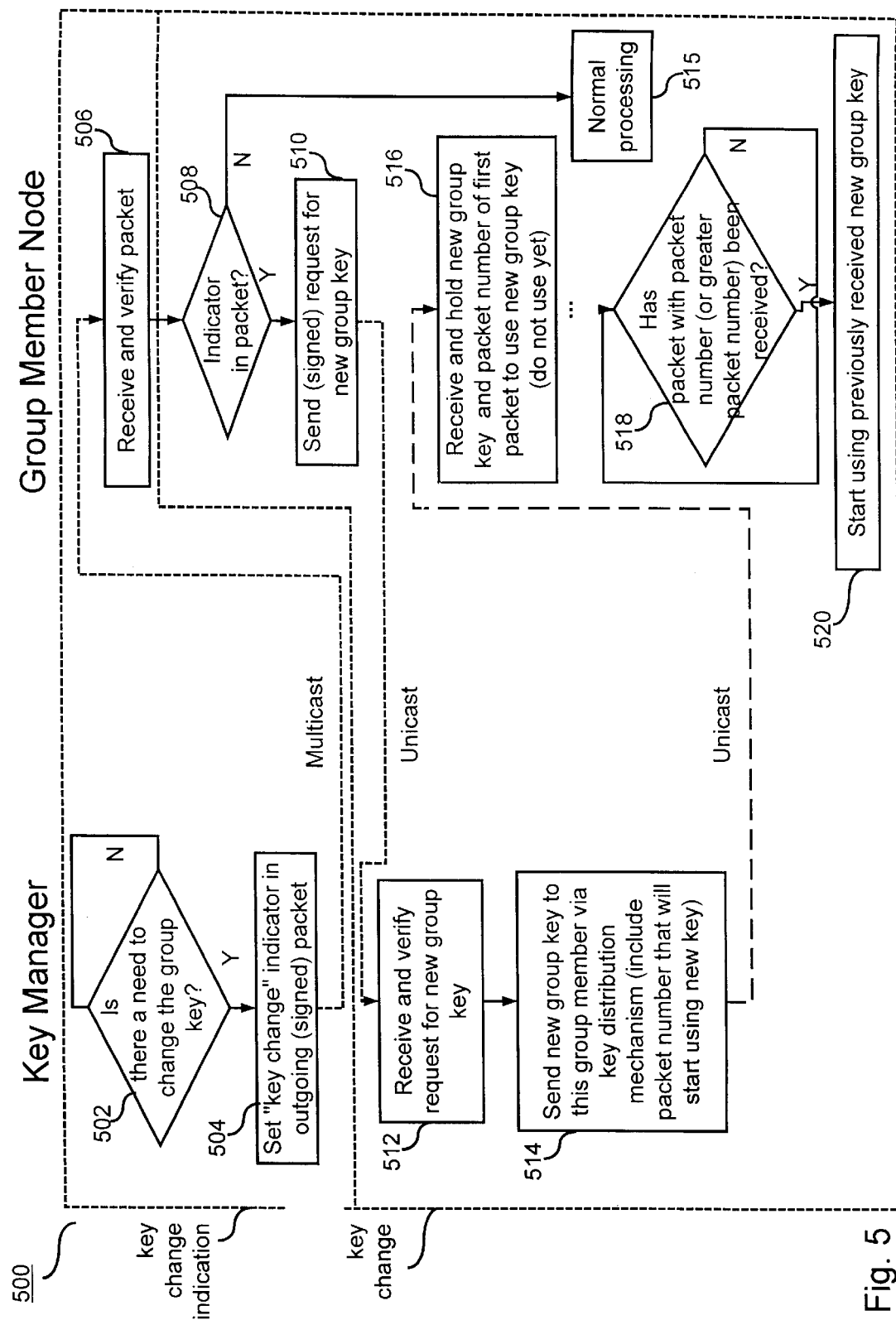
FIG. 5 is a flow chart showing steps performed by a third embodiment of the present invention to disseminate a group key.
Figure 10C:
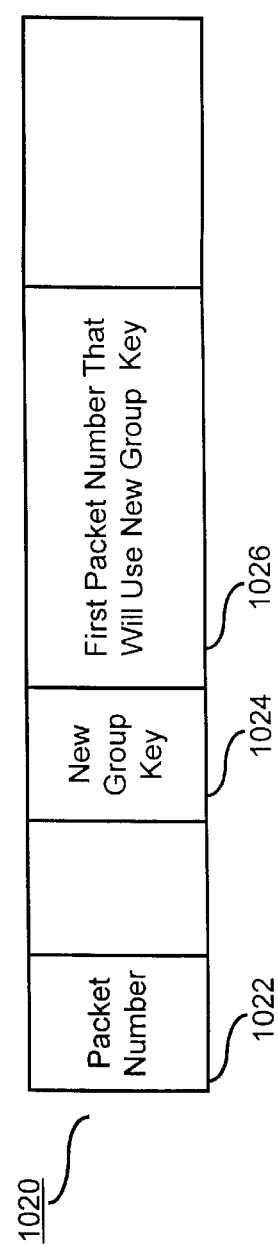

In the embodiment of FIG. 4, if group member 106 determines in step 418 that the time to change the group key has arrived, group member 106 then starts using the new group key to verify received messages in step 420. If the node receiving the new group key can send data (e.g., sender 104 of FIG. 1(b)), then the node also starts using the new group key at this time to encrypt data to be sent. FIG. 5 is a flow chart 500 showing steps performed by a third embodiment of the present invention to disseminate a group key. Steps 502 through 512 are similar to steps 302 through 312 of FIG. 3 and will not be described in detail. In step 514, key manager 102 preferably unicasts the new group key to the requesting receiver via any appropriate key distribution mechanism. The unicast of step 514 also includes a packet number. This packet number is the number of the first packet that the key manager will encrypt using the new group key. In this embodiment, packets are numbered sequentially by the sender. An example of a packet including a key and a packet number that will start using the new key is shown in FIG. 10(c).

In step 516, group member 106 receives the new group key and the packet number and holds them in its storage area. It will be understood that the key distribution mechanism can encrypt the group key and/or packet number when they are sent between the key manager and group member if such encryption is appropriate. The number of the first packet that will be sent using the new group key may be determined, for example, based on criteria such as the last packet number sent, the rate at which the packets are expected to be sent, and the amount of time required to distribute the new key. Thus, for example:

new packet#=current packet#+(rate*time*1.5), where 1.5 is a predetermined margin of error.

In the embodiment of FIG. 5, in step 518, if group member 106 determines that it has received a packet having the packet number received in step 516 (or a higher packet number), group member 106 then starts using the new group key to verify received messages. Group member 106 may need to save both the new and the old key for some predetermined time, since packets often arrive out of order. If the node receiving the new group key can send data (e.g., sender 104 of FIG. 1(b)), then the node starts using the new group key to encrypt data to be sent when it sends the packet having the received packet number or higher. If there is more than one sender in the group, the key manager needs to coordinate with the senders to make sure that all the senders have received (and will use) the new key and packet number.

Figure 6:
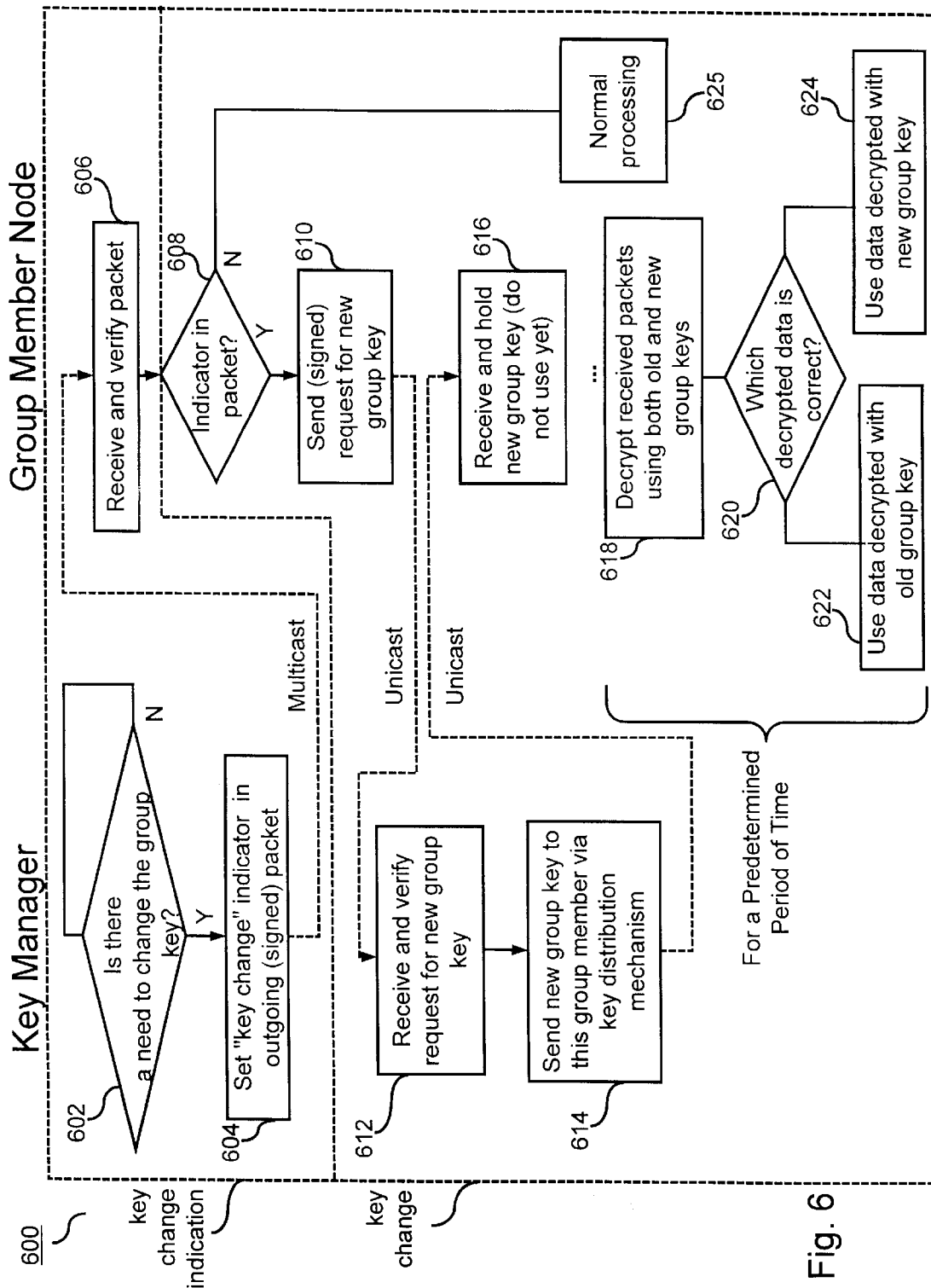
FIG. 6 is a flow chart showing steps performed by a fourth embodiment of the present invention to disseminate a group key.

FIG. 6 is a flow chart 600 showing steps performed by a fourth embodiment of the present invention to disseminate a group key. Steps 602 through 612 are similar to steps 302 through 312 of FIG. 3 and will not be described in detail. In step 614, key manager 102 preferably unicasts the new group key to the requesting group member via any appropriate key distribution mechanism. In step 616, group member 106 receives the new group key and holds the new group key in its storage area. It will be understood that the key distribution mechanism can encrypt the group key when it is sent between the key manager and group member if such encryption is appropriate.

In the embodiment of FIG. 6, group member 106 uses both the old group key and the new group key for a predetermined time period. In step 618, group member 106 decrypts received data using both keys. Steps 620, 622, and 624 use the data that is correct. For example, all data may have a known value in a known location. Whichever decrypted data contains the known value will be the correct data. In some embodiments, the predetermined time period is determined by the key manager and sent to the group members, either for each key change or at some previous time. In other embodiments, the predetermined time is determined by each group member, and may be the same or different for each member in a group. If the node receiving the new group key can also send data (e.g., sender 104 of FIG. 1(b)), then the node also starts using the new group key at this time to encrypt data to be sent.

Figure 7:
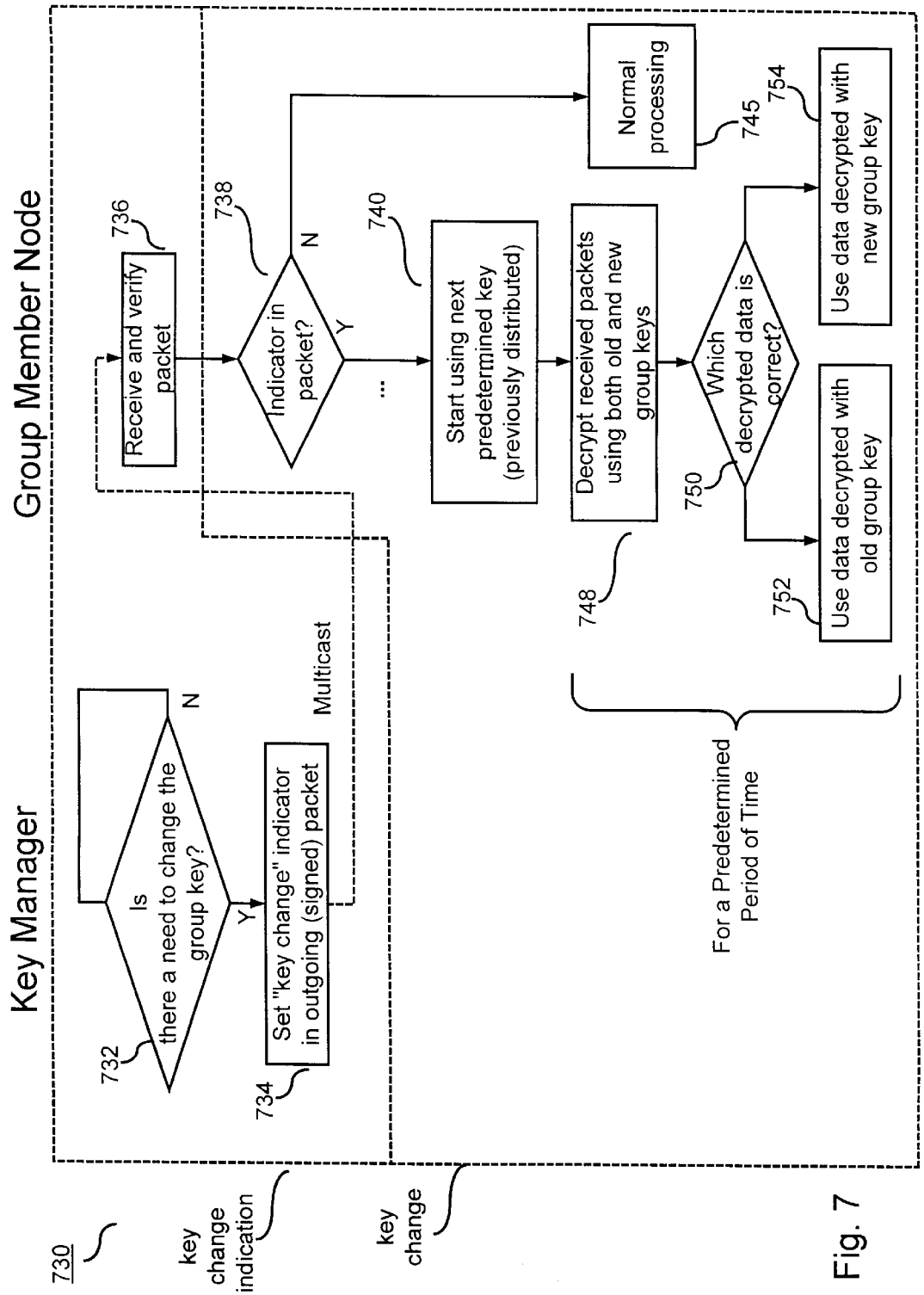
FIG. 7 is a flow chart showing steps performed by a fifth embodiment of the present invention to disseminate a group key.

FIG. 7 is a flow chart 730 showing steps performed by a fifth embodiment of the present invention to disseminate a group key. Steps 732 through 736 are similar to steps 302 through 306 of FIG. 3 and will not be described in detail. In this embodiment, a set of group keys has been previously distributed to the group members. When a group member receives a key change indicator, the group member starts using the next group key in the set. As shown in FIG. 7, some embodiments may use the new group key and the old group key for a predetermined period of time, as described, for example, above.

Figure 8:
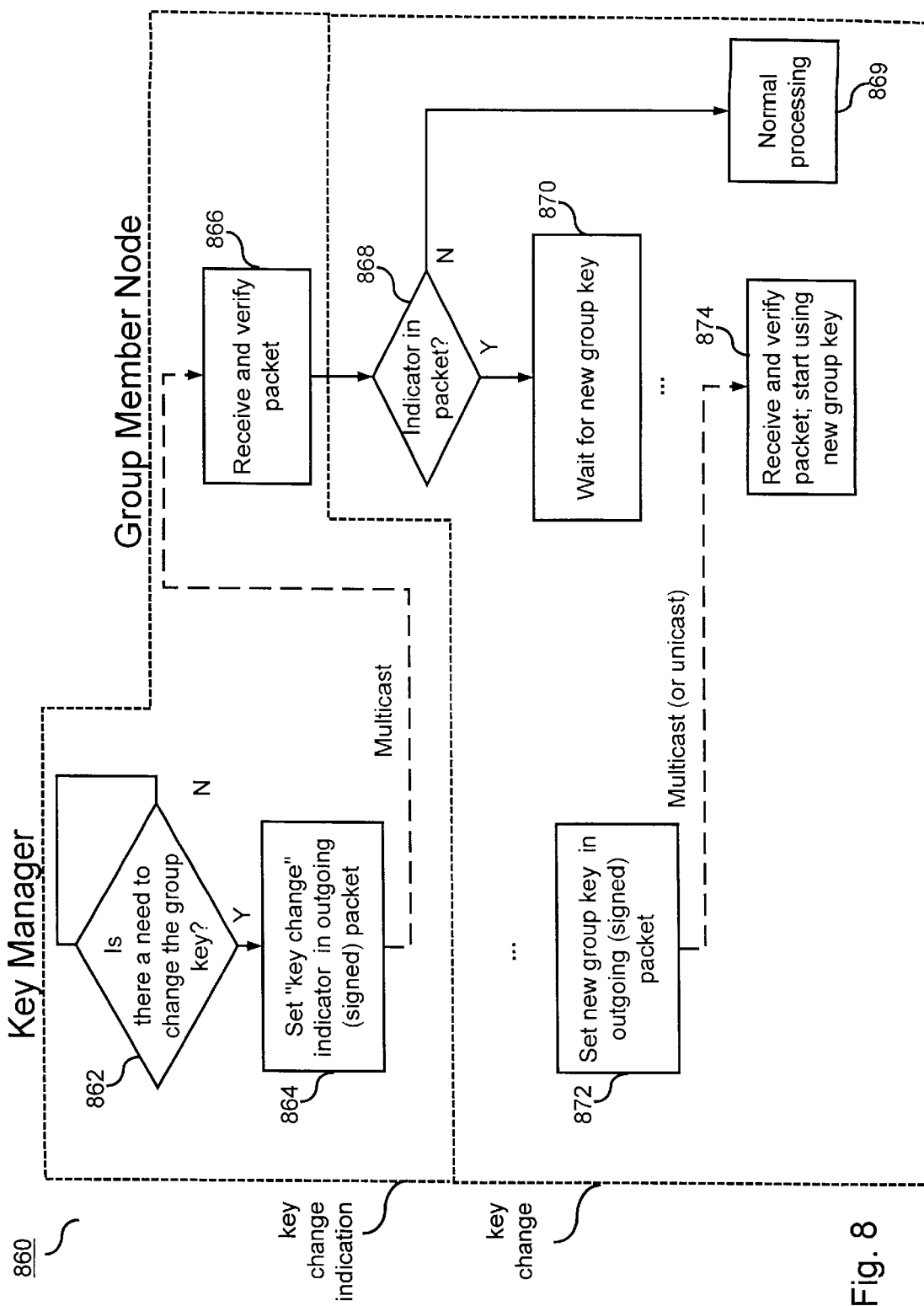
FIG. 8 is a flow chart showing steps performed by a sixth embodiment of the present invention to disseminate a group key.

FIG. 8 is a flow chart 860 showing steps performed by a sixth embodiment of the present invention to disseminate a group key. Steps 862 through 866 are similar to steps 302 through 306 of FIG. 3 and will not be described in detail. When a group member receives a key change indicator, the group member is alerted to wait for a new group key, which is sent by the key manager. This key can be distributed, for example, via multicasting or unicasting.

FIG. 9 is a diagram showing an example of a packet format including a key change indicator 904, indicating that the group key will be changed. The key change indicator of FIG. 9 is provided by way of example only. Any appropriate indicator can be used as a key change indicator and the key change indicator can be located in any appropriate part of the multicast packet. The key change indicator 904 can be, for example, a flag in a packet. The key change indicator 904 can also be indicator in the data, such as a control character. The key change indicator 904 can also be a separate type of packet or message.

FIGS. 10(a)–10(c) are diagrams showing examples of a packet sending the new key indicator to a multicast group. FIG. 10(a) shows a packet containing, among other information, a new group key 1002, such as would be sent in step 314 of FIG. 3. FIG. 10(b) shows a packet containing, among other information, a new group key 1012 and a time value 1014 representing a time to start using the new group key 1012, such as would be sent in step 414 of FIG. 4. FIG. 10(c) shows a packet containing, among other information, a new group key 1024 and a first packet number 1026 that will start using the new group key, such as would be sent in step 514 of FIG. 5. A packet having the format of FIG. 10(c) has a packet number 1022 in each packet.

Figure 11:
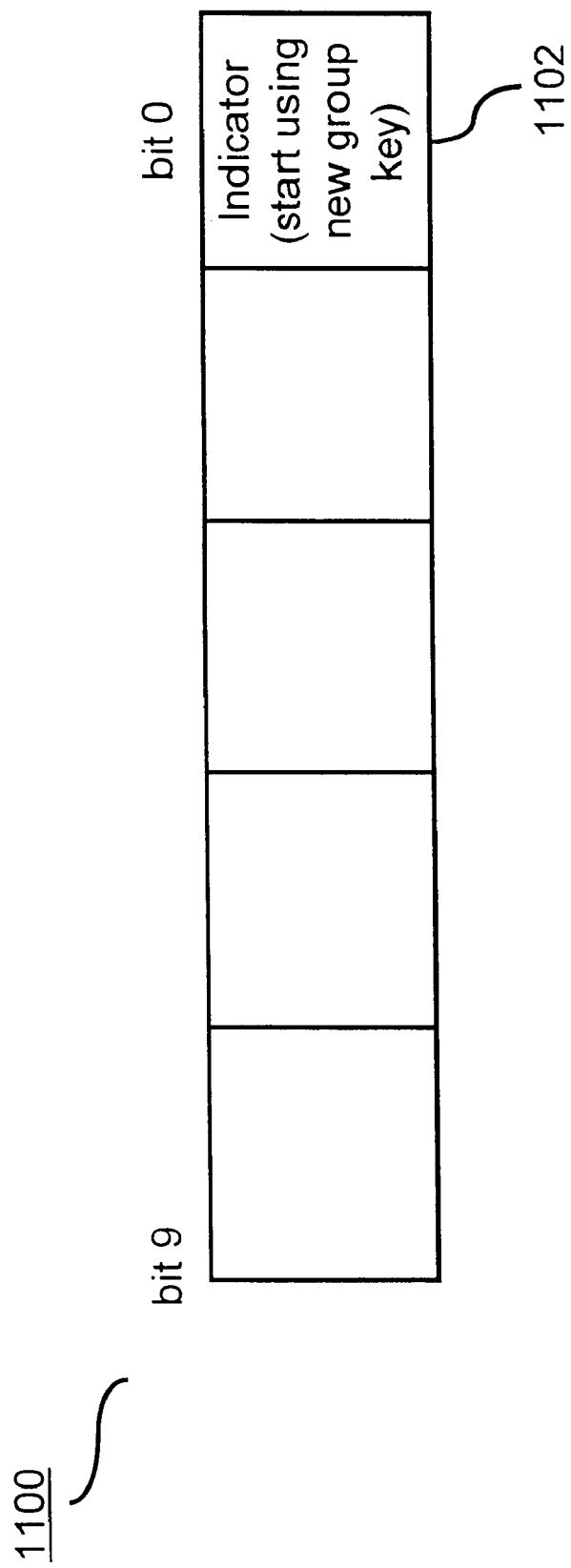
FIG. 11 is a diagram showing an example of a packet format including an indicator that the group key should begin to be used by group members.

FIG. 11 is a diagram showing an example of a packet format including an indicator 1102 to indicate that the group members can begin to use the new group key. The packet of FIG. 11 would be sent, for example, in step 320 of FIG. 3. Any appropriate indicator can be used. Similarly to the key change indicator 902, the indicator 1102 that the group can/should start using the new group key can also be a flag, a control character, a type of packet or message, or any other appropriate type of indicator.

In summary, the present invention provides a mechanism for a multicast key manager to change a group key used by all members in a group. In one embodiment, each of the group members then request the new group key. Once the key manager determines that all the group members have the group key, the key manager multicasts an indicator to all group members to start using the new group key to decrypt/encrypt multicasts to the group. In another embodiment, the key manager sends a time indicating at what time the new group key will become effective. In another embodiment, the key manager sends the first packet number for which the new group key will become effective. In yet another embodiment, the group members use both the old and new group keys for a predetermined period of time. In another embodiment, the group members already have a set of group keys and change to the next key in the set. In another embodiment, the key manager distributes a new group key without needing to receive requests from the group members.

While the invention has been described in conjunction with specific embodiments, it is evident that many alternatives, modifications and variations will be apparent to those skilled in the art in light of the foregoing description. For example, although the invention is described above in the context of a multicast group, the invention can also be used in any situation where a key manager needs to be able to control when a key is sent to a group of receivers. As another example, the present invention can send different keys to different senders and can then send the keys for each of the senders to all receivers. Accordingly, it is intended to embrace all such alternatives, modifications and variations as fall within the spirit and scope of the appended claims and equivalents.

What is claimed is:

1. A method of changing a group key, comprising the steps performed by a node including a key manager function in a system for processing data, of:

sending an indicator to each member of a group that it is time to change the group key; and distributing, after sending the indicator, a new group key to at least one member of the group.

2. The method of claim 1, wherein the step of sending an indicator includes the step of sending the indicator using multicast to all members of the group.

3. The method of claim 1, further comprising the step of:
receiving a request for a new group key, in response to the indicator, from at least one member of the group.

4. The method of claim 3, wherein the step of receiving a request includes the step of receiving a unicast request from the at least one member of the group.

5. The method of claim 3, wherein the distributing step includes the step of unicasting a new group key to the requesting at least one member of the group.

6. The method of claim 1, wherein the distributing step includes the steps of:
determining, after the step of sending the new group key, that all members of the group have received the new group key; and
sending a second indicator to the members of the group to start using the new group key.

7. The method of claim 1, wherein the distributing step includes the steps of:
determining, after the step of sending the new group key, that a timeout has occurred, even though not all members of the group have received the new group key; and
sending a second indicator to the members of the group to start using the new group key.

8. The method of claim 1, wherein the distributing step includes the step of:
sending the new group key to at least one member of the group, along with a time value.

9. The method of claim 8, further comprising the step of determining, by the at least one member of the group, in accordance with the time value, that it is time to start using the new group key.

10. The method of claim 1, wherein the distributing step includes the step of:
sending the new group key to at least one member of the group, along with a packet number indicating a first packet that is to use the new group key.

11. The method of claim 10, further comprising the step of determining, by the at least one member of the group, in accordance with the packet number, that it is time to start using the new group key.

12. The method of claim 1, further comprising the step, performed by the at least one group member, of decrypting information received from a sender node using both an old group key and the new group key for a predetermined time period.

13. The method of claim 1, further comprising the step, performed by the at least one group member, of encrypting information using the new group key and sending the encrypted information to another group member.

14. The method of claim 1, wherein the distribution step includes:
sending, by the key manager, a different group key of a plurality of group keys to respective ones of a plurality of senders in the group, and
sending, by the key manager, the plurality of group keys to each of a plurality of receivers in the group.

15. The method of claim 1, further comprising the step, performed by the at least one group member, of decrypting information that is received from another group member, using the new group key.

16. The method of claim 1, wherein the distributing step includes the step of sending the group key to at least one group member without receiving a request from the at least one group member.

17. A method of changing a group key, comprising the steps performed by a node including a key manager function in a system for processing data, of:
distributing a set of group keys to each member of a group;
sending an indicator to each member of a group that it is time to change the group key; and
changing, by at least one member of the group, to a next group key in the set of group keys.

18. The method of claim 17, wherein the indicator is multicast to the group members.

19. A method of changing a group key, comprising the steps performed by a system for processing data, of:
sending, by a key manager node, an indicator to each member of a group that it is time to change the group key; and
changing, by at least one group member, to a new group key responsive to the indicator.

20. The method of claim 19, further comprising the steps of:
receiving, by the key manager node, a request from the at least one group member for the new group key; and
distributing, by the key manager node, in response to the request, a new group key to the requesting members of the group.

21. The method of claim 19, further comprising the step of:
encrypting and sending, by a first member of the group to a second member of the group, information in accordance with the new group key.

22. The method of claim 19, further comprising the step of decrypting using the new group key, by a first member of the group, information sent by another member of the group.

23. The method of claim 19, further comprising the step of receiving, after the step of sending the indicator, a second indicator from the key manager node indicating that the group members should start using the new group key.

24. The method of claim 20,
wherein the step of distributing the new group key includes the step of sending a time value to the at least one member of the group.

25. The method of claim 24, further comprising the step of determining, by the at least one member of the group, in accordance with the time value, that it is time to start using the new group key.

26. The method of claim 19,
wherein the step of sending a new group key includes the step of sending a packet number to the at least one member of the group, the packet number indicating a first packet that is to use the new group key.

27. The method of claim 26, further comprising the step of determining, by the at least one member of the group, in accordance with the packet number, that it is time to start using the new group key.

28. The method of claim 19, further comprising the step, performed by the at least one group member, of decrypting information received from a sender node using both an old group key and the new group key for a predetermined time period.

29. A method of changing a group key, comprising the steps performed by a member of a group in a system for processing data, of:
receiving, by the member of the group, an indicator that it is time to change the group key; and
receiving, after the first receiving step, the new group key.

30. The method of claim 29, further comprising the step of:

sending, by the member of the group, in response to the indicator, a request for a new group key.

31. The method of claim 29, wherein the step of receiving an indicator includes the step of receiving the indicator via multicast.

32. The method of claim 30, wherein the step of sending a request includes the step of sending a unicast request by the member of the group.

33. The method of claim 29, wherein the key receiving step includes the step of receiving a new group key by the member of the group, where the new group key is unicast to the member of the group.

34. The method of claim 29, further comprising the step of receiving a second indicator that indicates to start using the new group key.

35. The method of claim 29,
wherein the step of receiving a new group key includes the step of receiving a time value at which time the new group key will take effect.

36. The method of claim 35, further comprising the step of determining, by the member of the group, in accordance with the time value, that it is time to start using the new group key.

37. The method of claim 29,
wherein the step of receiving a new group key includes the step of receiving a packet number, the packet number indicating a first packet that will use the new group key.

38. The method of claim 37, further comprising the step of determining, by the at least one member of the group, in accordance with the packet number, that it is time to start using the new group key.

39. The method of claim 29, further comprising the step, performed by the member of the group, of decrypting information received from another group member using both an old group key and the new group key for a predetermined time period.

40. The method of claim 29, further comprising the step of:

encrypting and sending, by the member of the group to at least one receiver in the group, information in accordance with the new group key.

41. The method of claim 29, further comprising the step of decrypting using the new group key, by the member of the group, information sent by another member of the group.

42. The method of claim 29, wherein the step of receiving the new group key includes the step of receiving the new group key without having to make a request for the new group key.

43. An apparatus that changes a group key, comprising:
a portion configured to send an indicator to each member of a group that it is time to change the group key; and
a portion configured to send a new group key to at least one member of the group.

44. A computer program product comprising:
a computer usable medium having computer readable code embodied therein for changing a group key, the computer program product including:
computer readable program code devices configured to cause a computer to effect sending an indicator to each member of a group that it is time to change the group key; and
computer readable program code devices configured to cause a computer to effect distributing a new group key to at least one member of the group.

45. A computer data signal embodied in a carrier wave and representing sequences of instructions which, when executed by a processor, cause the processor to change a group key, by performing the steps of:
sending an indicator to each member of a group that it is time to change the group key; and
distributing a new group key to at least one member of the group.

46. An apparatus that changes a group key, comprising:
means for sending an indicator to each member of a group that it is time to change the group key; and
means for distributing a new group key to at least one member of the group.

* * * * *